United States Patent
Pinkalla et al.

(10) Patent No.: US 8,434,526 B1
(45) Date of Patent: May 7, 2013

(54) PLIABLE-WALL AIR DUCTS WITH SUSPENDED FRAMES

(75) Inventors: Cary Pinkalla, Fox Point, WI (US); Frank Heim, Platteville, WI (US); Kevin J. Gebke, Dubuque, IA (US); Nicholas L. Kaufman, Sherill, IA (US); William A. Niehaus, Holy Cross, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 13 days.

(21) Appl. No.: 13/288,795

(22) Filed: Nov. 3, 2011

(51) Int. Cl.
*F16L 3/00* (2006.01)

(52) U.S. Cl.
USPC ........... 138/107; 138/106; 138/172; 138/118; 248/61

(58) Field of Classification Search .................. 138/107, 138/106, 118, 172; 248/61
See application file for complete search history.

(56) References Cited

U.S. PATENT DOCUMENTS

| | | | | |
|---|---|---|---|---|
| 2,091,265 | A * | 8/1937 | Brown | 138/107 |
| 3,520,244 | A * | 7/1970 | Gaines, Jr | 454/277 |
| 4,625,631 | A * | 12/1986 | Vera | 454/172 |
| 4,944,973 | A * | 7/1990 | Follette | 428/36.1 |
| 5,137,057 | A * | 8/1992 | Hummert, III | 138/107 |
| 5,285,818 | A * | 2/1994 | Hummert, III | 138/107 |
| 5,429,330 | A * | 7/1995 | Bond et al. | 248/61 |
| 6,425,417 | B1 * | 7/2002 | Paschke | 138/107 |
| 2008/0113610 | A1 | 5/2008 | Brown et al. | |
| 2009/0288727 | A1 * | 11/2009 | Nordstrom | 138/107 |

FOREIGN PATENT DOCUMENTS

EP 1091179 4/2001

* cited by examiner

*Primary Examiner* — Patrick F Brinson
(74) *Attorney, Agent, or Firm* — Hanley, Flight & Zimmerman, LLC

(57) ABSTRACT

Pliable-wall air ducts with suspended frames are disclosed herein. An example air duct system includes an air duct having a pliable sidewall to extend in a longitudinal direction, the pliable sidewall having a total weight and a framework to be disposed within the air duct. The framework includes a shaft extending in the longitudinal direction, a rib to engage an inner surface of the air duct and a plurality of spokes connecting the rib to the shaft. The example air duct system includes one or more hangers comprising an elongate member having an upper section and a lower section. The lower section to extend through a corresponding opening defined by the pliable side wall and to be coupled to the framework. Most of the total weight of the pliable sidewall is to be carried by the framework.

24 Claims, 9 Drawing Sheets

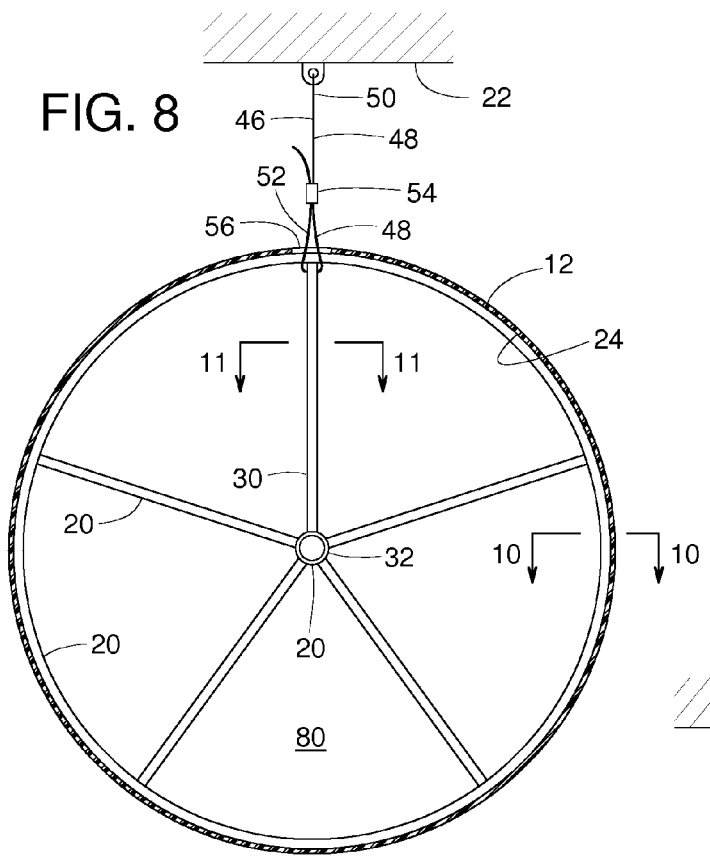
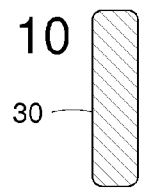
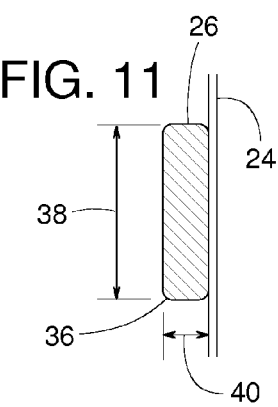
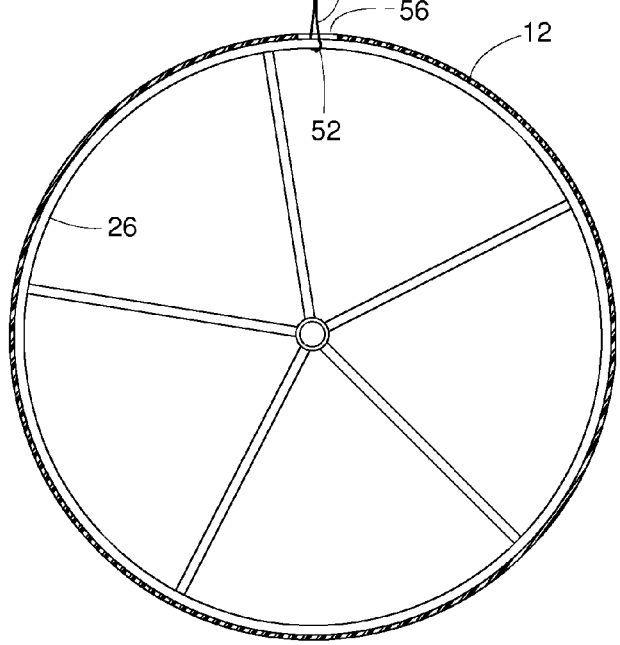

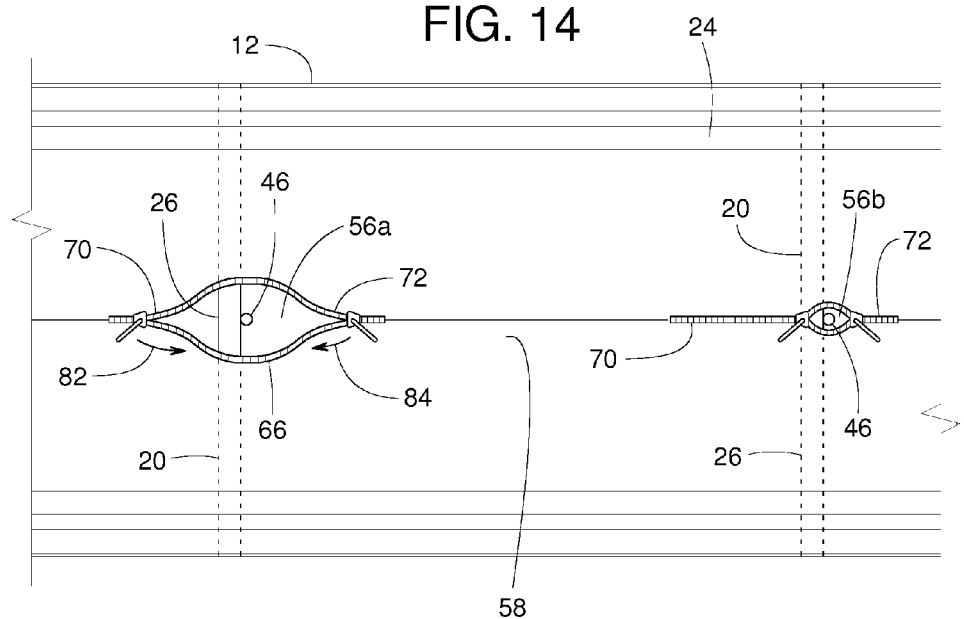
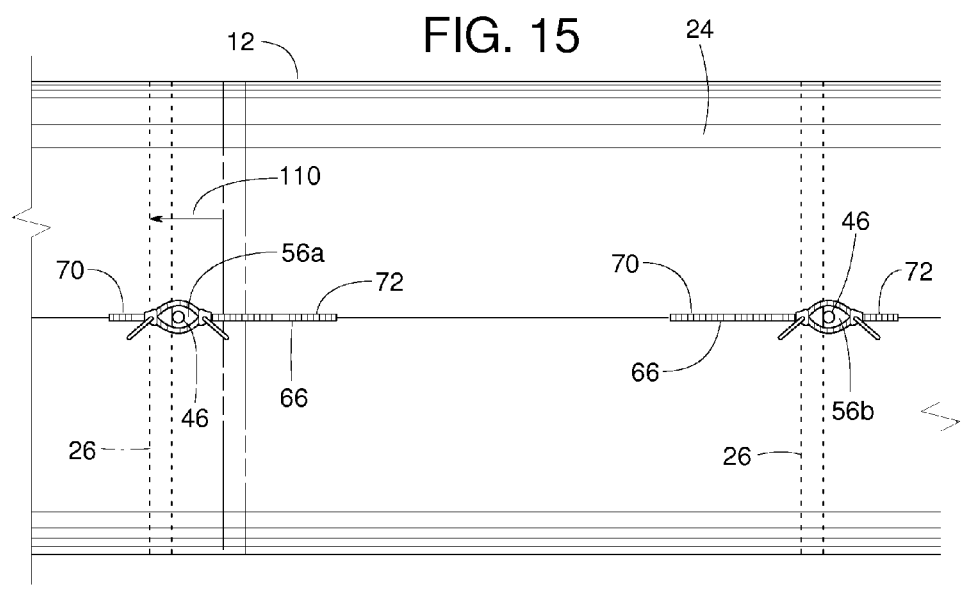

PLIABLE-WALL AIR DUCTS WITH SUSPENDED FRAMES

FIELD OF THE DISCLOSURE

This patent generally pertains to air ducts and, more specifically, to pliable-wall air ducts with suspended frames.

BACKGROUND

Ductwork is often used for conveying conditioned air (e.g., heated, cooled, filtered, etc.) discharged from a fan and distributing the air to a room or other areas within a building. Ducts are typically formed of rigid metal, such as steel, aluminum, or stainless steel. In many installations, ducts are hidden above suspended ceilings for convenience and aesthetics. But in warehouses, manufacturing plants and many other buildings, the ducts are suspended from the roof of the building and are thus exposed. In those warehouse or manufacturing environments where prevention of air-borne contamination of the inventory is critical, metal ducts can create problems.

For instance, temperature variations in the building or temperature differentials between the ducts and the air being conveyed can create condensation on both the interior and exterior of the ducts. The presence of condensed moisture on the interior of the duct may form mold or bacteria that the duct then passes onto the room or other areas being supplied with the conditioned air. In the case of exposed ducts, condensation on the exterior of the duct can drip onto the inventory or personnel below. The consequences of the dripping can range anywhere from a minor irritation to a dangerously slippery floor or complete destruction of products underneath the duct (particularly in food-processing facilities).

Further, metal ducts with localized discharge registers have been known to create uncomfortable drafts and unbalanced localized heating or cooling within the building. In many food-processing facilities where the target temperature is 42 degrees Fahrenheit, a cold draft can be especially uncomfortable and perhaps unhealthy.

Many of the above problems associated with metal ducts are overcome by the use of flexible fabric ducts, such as DUCTSOX from DuctSox Corporation of Peosta and Dubuque, Iowa. Such ducts typically have a pliable fabric wall (often porous) that inflates to a generally cylindrical shape by the pressure of the air being conveyed by the duct. Fabric ducts seem to inhibit the formation of condensation on its exterior wall, possibly due to the fabric having a lower thermal conductivity than that of metal ducts. In addition, the fabric's porosity and/or additional holes distributed along the length of the fabric duct broadly and evenly disperse the air into the room being conditioned or ventilated. The even distribution of airflow also effectively ventilates the walls of the duct itself, thereby further inhibiting the formation of mold and bacteria.

Fabric air ducts are often installed at an elevated position within a room, and various means have been developed for suspending them from an overhead support, such as a ceiling, track or cable. These types of air ducts are typically mounted to the ceiling from attachment points on the fabric sidewall itself. As a result, the fabric is often distorted around these attachment points.

BRIEF DESCRIPTION OF THE DRAWINGS

FIG. 8 is a cross-sectional front view similar to FIG. 12 but showing another example rib suspended from an example hanger.

FIG. 9 is a front view of the rib shown in FIG. 8 but showing the hanger coupled to the rib in another way.

FIG. 10 is a cross-sectional view taken along line 11-11 of FIG. 8.

FIG. 11 is a cross-sectional view taken along line 10-10 of FIG. 8.

FIG. 14 is a top view taken along line 14-14 of FIG. 1, wherein the hanger is schematically illustrated as having a circular cross-section.

FIG. 15 is a top view taken along line 15-15 of FIG. 2, wherein the hanger is schematically illustrated as having a circular cross-section.

DETAILED DESCRIPTION

Certain examples are shown in the above-identified figures and described in detail below. In describing these examples, like or identical reference numbers are used to identify same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

Distortion of fabric air ducts is more evident in instances where there is an internal framework installed within the fabric air duct, as the attachment points must support the weight of the fabric and the heavier framework. With this configuration, an increased number of attachment points may have to be used in order to better distribute the weight, thereby lessening the distortion. As a result of the increased number of attachment points, a track or cable is usually mounted to the ceiling in order to provide an easier means for securing the suspension hardware. In air ducts incorporating an internal framework, suspension of the duct using attachment points on the fabric sidewall creates the less than optimal situation where a material of lesser structural integrity and susceptibility to damage (the fabric) is supporting the weight of the internal framework, which has greater structural integrity and lower susceptibility to damage. Current means of suspension, however, are not necessarily suitable for all types of fabric air ducts.

Example air ducts disclosed herein comprise a pliable tubular sidewall with an internal framework. A series of vertically elongate hangers suspend the air duct from a ceiling or other overhead support such that the framework carries most of the pliable sidewall's weight. In some examples, each hanger is coupled to the internal framework by access through adjustable size openings at the top of the tubular sidewall. Once the hangers are coupled to the framework, the openings close around the hangers to reduce (e.g., minimize) air leakage through the openings. In some examples, each opening is a slit with a zipper that closes from opposite ends of the slit. In some examples, the framework comprises a series of sidewall-supporting rings attached to a shaft assembly that has an adjustable length. Lengthening the shaft assembly within the pliable air duct holds the duct in a generally expanded shape, radially and longitudinally, even when the duct is depressurized.

Figure 1:
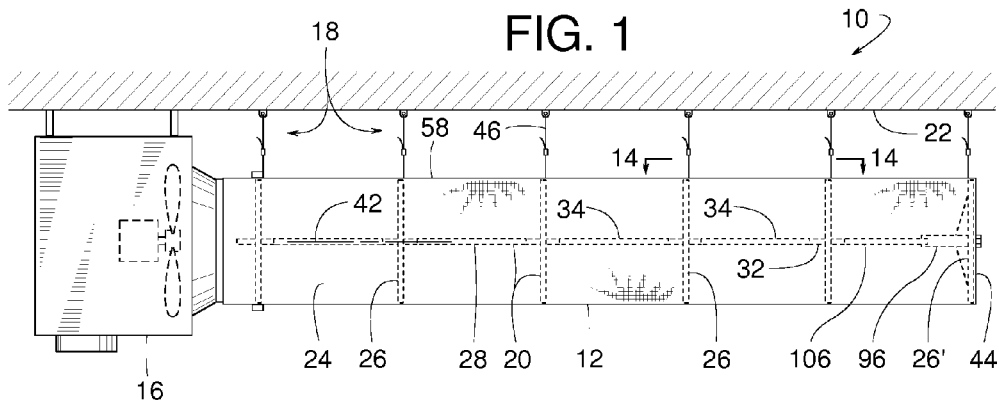
FIG. 1 is a side view of a de-energized example air duct system with an internal framework suspended from an example set of hangers.
Figure 2:
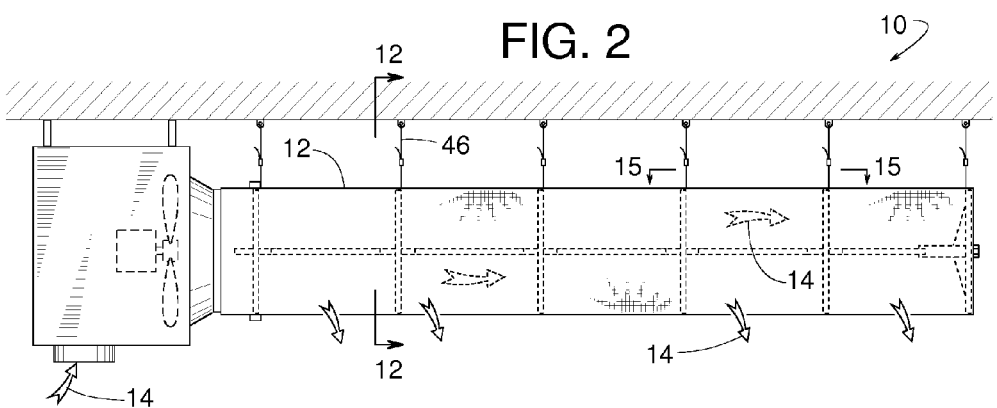
FIG. 2 is a side view similar to FIG. 1 but showing the air duct pressurized by a blower.

FIGS. 1 and 2 show an example air duct system 10 with pliable wall air duct 12 for conveying supply air 14 discharged from a blower 16 and then dispersing or otherwise delivering air 14 to a room or other areas of a building. In other examples, air duct 12 is used as a return air duct through which blower 16 draws air at subatmospheric pressure.

Figure 3:
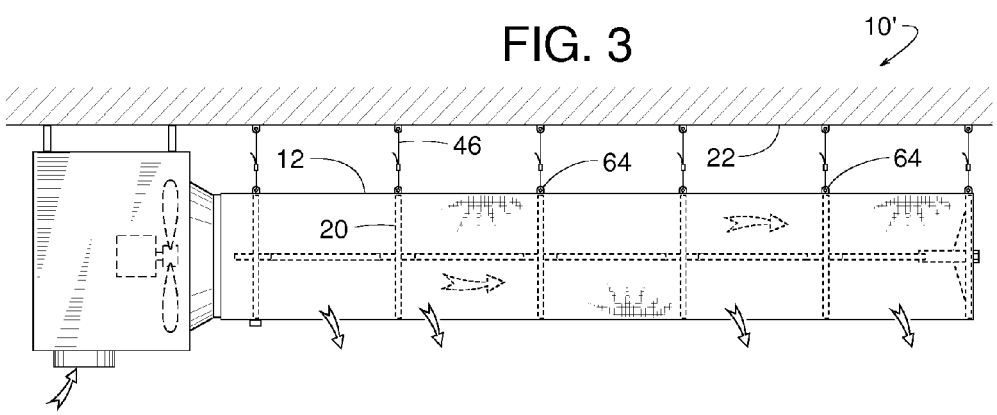
FIG. 3 is a side view similar to FIG. 2 but showing another example air duct system with another example set of hangers.
Figure 13:
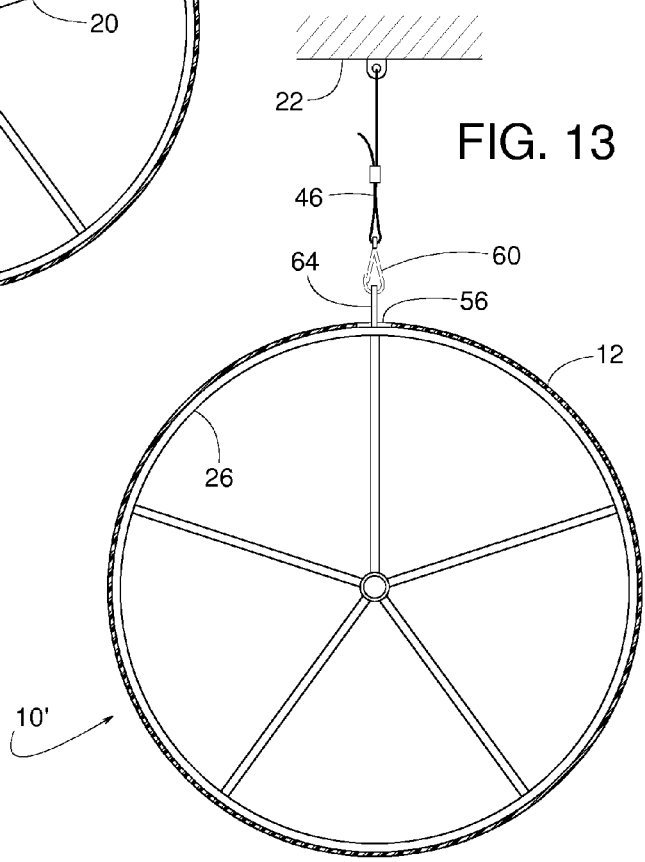
FIG. 13 is a cross-sectional front view similar to FIG. 12 but showing another example rib with an example hanger connected to a protrusion extending upward from the rib.

System 10 includes an example hanger system 18 suspending an internal framework 20 from an overhead support 22 (e.g., a ceiling, beam, roof truss, cable, rail, etc.). In the illustrated example, framework 20 and hanger system 18 provide one or more benefits including, but not limited to: holding duct 12 in a generally expanded shape regardless of the duct's internal air pressure; less distortion of fabric for better appearance and possibly increased life due to decreased stress on fabric sidewall; enabling duct 12 to function as either a supply or return air duct; being able to suspend framework 20 without having to rely on the strength of the duct's pliable wall material for support; reduced number of hangers required (due to suspension of the duct from the internal framework rather than the fabric sidewall) resulting in reduced product cost, reduced shipping cost, reduced installation cost, time, weight; the elimination of the need to use a track or cable to mount the suspension hardware; reduced safety hazard in case of fire due to metal to metal hanging attachment, and being able to accommodate axial misalignment between framework 20 and the surrounding pliable wall of duct 12. FIG. 3 shows another example air duct system 10' with a slightly different framework and hanger system, which will be explained later with reference to FIG. 13.

To convey air 14, duct 12 comprises a sidewall 24 made of a pliable material and formed in a tubular shape. As used herein, the term "sidewall" refers to the full circumferential extent of the fabric tube, even if the portion of the sidewall runs along the top or bottom of the tube or anywhere in between. Some examples of pliable sidewall materials include, but are not limited to, a polymer coated or impregnated cloth fabric, an uncoated fabric, a polyester sheet, other polymer or non metallic sheets, and various combinations thereof. To release air 14 from within duct 12 to the room or area it serves, sidewall 24 and/or an end cap 44 of duct 12 includes one or more discharge openings such as, for example, cut-out openings, plastic or metal discharge registers, and/or porosity in the sidewall material itself.

To support the duct's pliable sidewall 24 and to hold it in a generally expanded cylindrical shape, the illustrated example of framework 20 comprises a plurality of ribs 26 supported by a shaft 28. Structural details of framework 20 may vary, and FIGS. 4-13 illustrate some example variations. In some examples, a plurality of spokes 30 connect ribs 26 to respective hubs 32 of shaft 28. In some examples, hubs 32 are tubes, and in other examples, hubs 32 are solid rods. Various examples of shaft 28 include, but are not limited to, one solid full-length rod, one continuous tube, a shaft assembly, an assembly of tubes, an assembly of rods, an assembly of rods and tubes, an assembly of hubs 32 and shaft segments 34 (e.g. tubular shaft segments, solid rod shaft segments, etc.). In some examples of shaft 28, telescopic joints interconnect a plurality of shaft segments and hubs.

In some examples, each rib 26 is a full-circle ring formed of cold-rolled bar stock having a generally rectangular cross-section with rounded corners 36, as shown in FIG. 11. In some examples, the cross-section has a width 38 of about 11 millimeters and a thickness 40 of about 2.5 millimeters. In some examples, spokes 30 have a similar rectangular cross-section, as shown in FIG. 11. In some examples, width 38 of rib 26 and spokes 30 extend generally parallel to a longitudinal direction 42 defined by duct 12. Such an orientation of the width dimension provides a broad area of supporting contact between rib 26 and an internal surface of duct 12 (internal surface of sidewall 24) and provides greater rigidity between rib 26 and hub 32. Other examples of rib 26, spokes 30 and hub 32 include, but are not limited to, ribs of any cross-sectional shape, size, quantity, material and orientation; spokes of any cross-sectional shape, size, quantity, material and orientation; and hubs of any cross-sectional shape, size, quantity, material and orientation. In some examples, rib 26 (partial ring or full-circle ring) is comprised of a rod having a generally round cross-sectional area.

Figure 4:
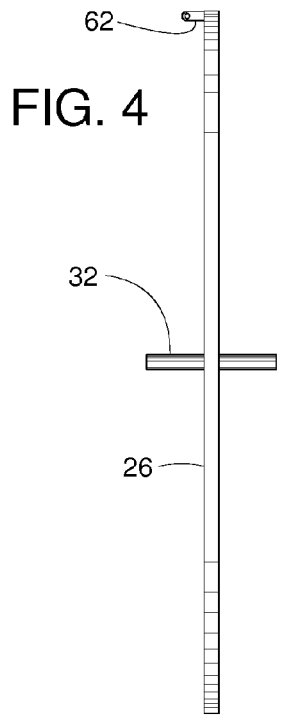
FIG. 4 is a side view of an example rib in the form of a ring.
Figure 5:
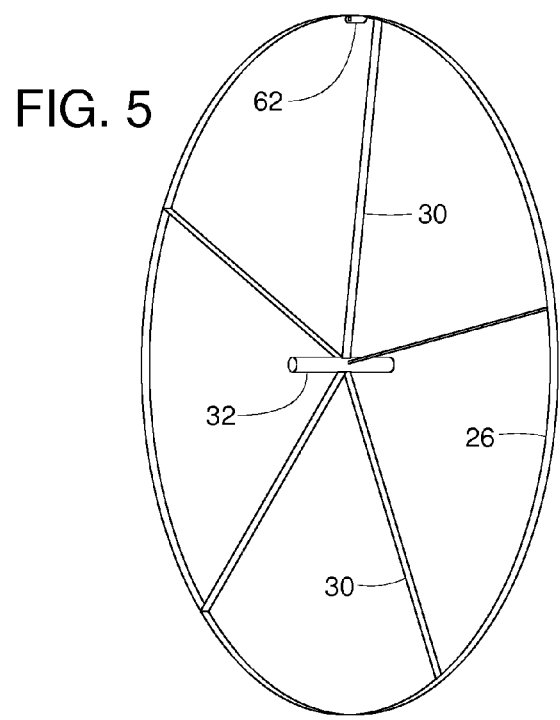
FIG. 5 is a perspective view of the rib shown in FIG. 4.
Figure 6:
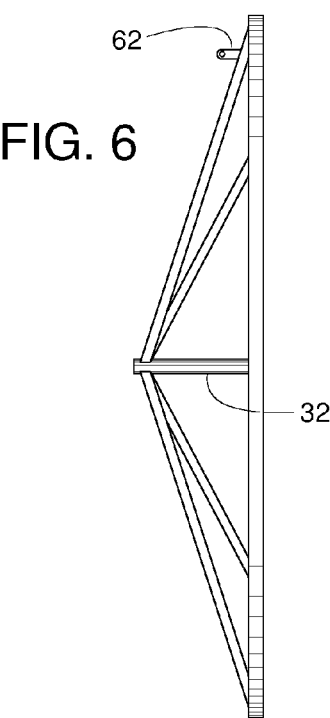
FIG. 6 is a side view of another example rib in the form of a ring.
Figure 7:
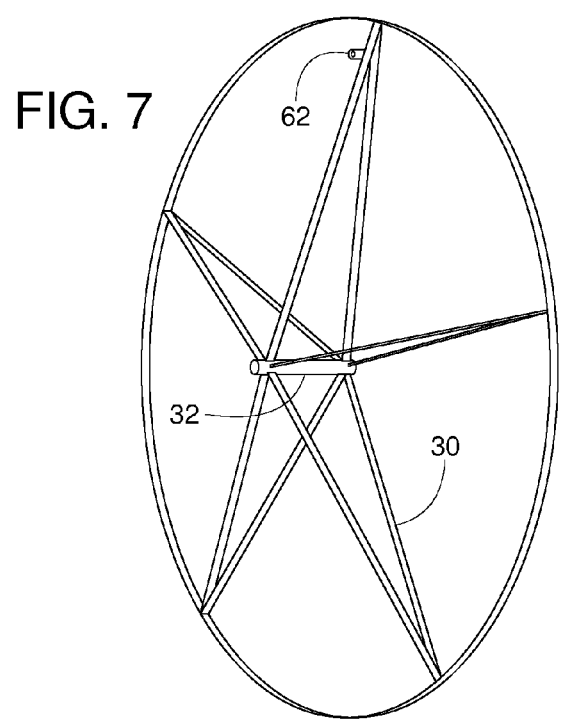
FIG. 7 is a perspective view of the rib shown in FIG. 6.

Spokes 30 connect ring 26 to hub 32 as shown in FIGS. 6 and 7 to provide generally flat engagement with an end cap 44 of duct 12. Spokes 30 connect ring 26 to hub 32 as shown in FIGS. 4 and 5 for simplicity and for a more balanced structure at intermediate points along the length of duct 12.

To suspend framework 20 (and pliable duct 12 thereon) from overhead support 22, some examples of hanger system 18 include a plurality of hangers 46, as shown in FIGS. 8, 9, 12 and 13. In some examples, each hanger 46 comprises an elongate member 48 having an upper section 50 for coupling to overhead support 22 and a lower section 52 for coupling to framework 20. Examples of elongate member 48 include, but are not limited to, a stranded steel cable, a wire, chain, strap and/or a rope. In some examples, one or more of the hangers 46 include a length adjuster 54 that provides hangers 46 with an adjustable length between upper and lower sections 50 and 52, thus providing means for leveling or otherwise adjusting the elevation of various support points along duct 12. Examples of length adjuster 54 include, but are not limited to a cable clamp, turnbuckle, a Gripple XP2-10BB, and a Gripple HF2-10BB, wherein the Gripple examples are provided by Gripple Ltd. of Sheffield, England.

By having framework 20 suspended from hangers 46, framework 20, in some examples, carries at least most of the total weight of the duct's pliable sidewall 24. In some examples where duct 12 is attached to a housing of blower 16, a portion of the sidewall's weight is carried by the blower's housing. Various means for connecting hanger 46 to framework 20 are illustrated in FIGS. 8, 9, 12 and 13. In FIG. 8, lower section 52 of hanger 46 extends through one opening 56 of a plurality of openings 56 in sidewall 24 and loops around spoke 30. In some examples, openings 56 are distributed and spaced apart in longitudinal direction 42 along an uppermost surface 58 of sidewall 24. In FIG. 9, lower section 52 of hanger 46 extends through opening 56 and loops around rib 26.

Figure 12:
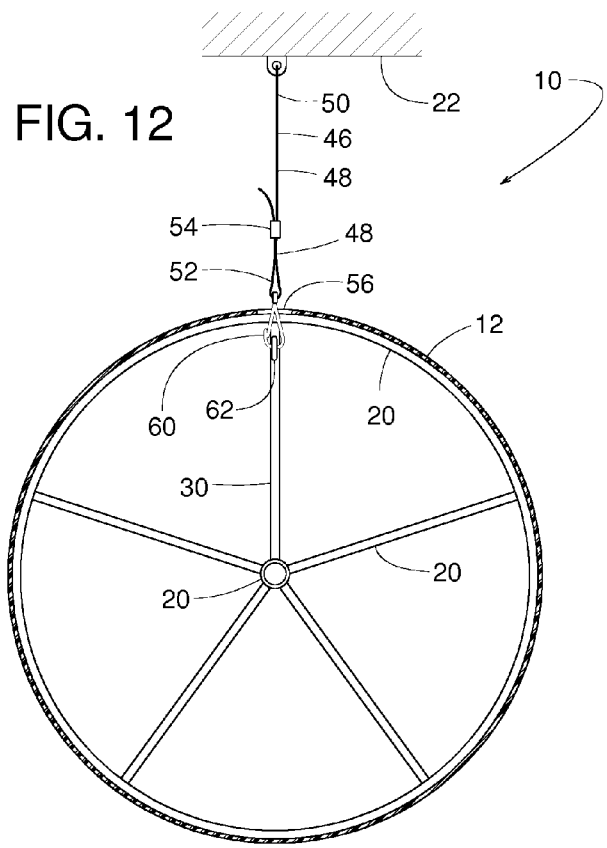
FIG. 12 is a cross-sectional view taken along line 12-12 of FIG. 2.

In FIG. 12, the hanger's lower end 52 includes a releasable connector 60 (e.g., a snap, latch, hook, etc.) that selectively engages and disengages a tab 62 extending from spoke 30. In other examples, releasable connector 60 selectively engages and disengages a tab 62 extending from rib 26 (see FIGS. 4 and 5). In the example of air duct system 10', shown in FIGS. 3 and 13, a protrusion 64 of a plurality of protrusions 64 extending from framework 20 and protruding upward through opening 56 provides another example means for the hanger's lower section 52 to connect to framework 20 via access through opening 56. In some examples, protrusion 64 extends from rib 26. In some examples, protrusion 64 extends from spoke 30. In some examples, the protrusion defines an opening to enable coupling with the hanger lower section 52.

In some cases, it may be difficult maintaining precise alignment between rib 26 and opening 56, which can make it difficult for hanger 46 to access framework 20 through openings 56. Misalignment between rib 26 and opening 56 can be caused by various reasons such as limited manufacturing tolerances, axial/longitudinal shifting of framework 20 relative to holes 56 due to air pressure changes within duct 12, axial/longitudinal shifting of framework 20 relative to holes 56 due to mechanical lengthening of framework 20, and material shrinkage or stretching of sidewall 24.

To accommodate possible misalignment between rib 26 and openings 56, in some examples, openings 56 are a series of slits extending in longitudinal direction 42 and being configurable selectively to a more-open configuration (e.g., opening 56a in FIG. 14) and a less-open configuration (e.g., opening 56b in FIG. 14). Thus, hanger 46 can access framework 20 at any location within the slit's length. In the more-open configuration, hanger 46 is readily coupled to framework 20. After hanger 46 is coupled to framework 20, the opening's less-open configuration minimizes air leakage through opening 56.

Figure 16:
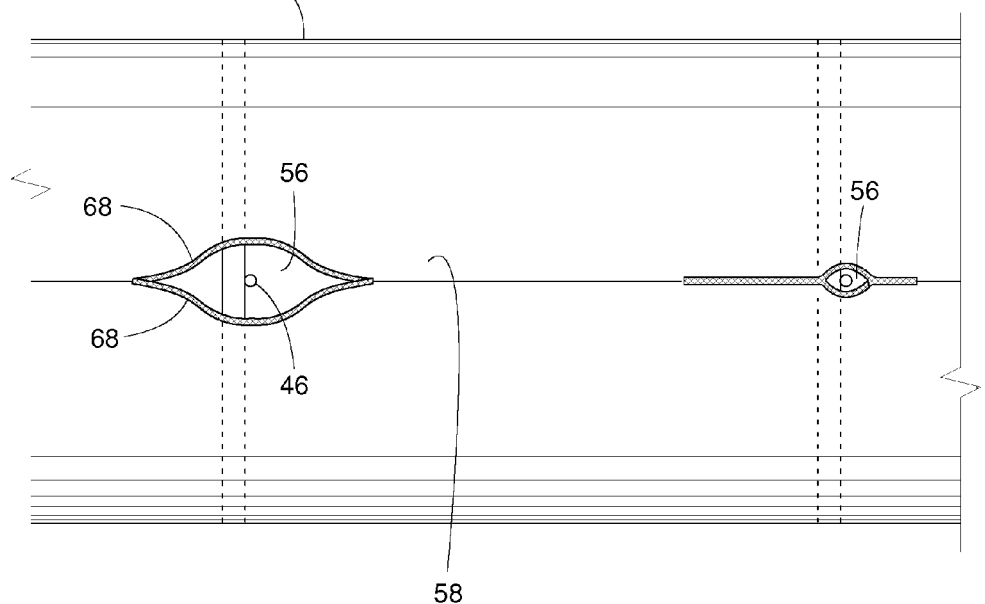
FIG. 16 is a top view similar to FIG. 14 but showing another example releasable connector.
Figure 17:
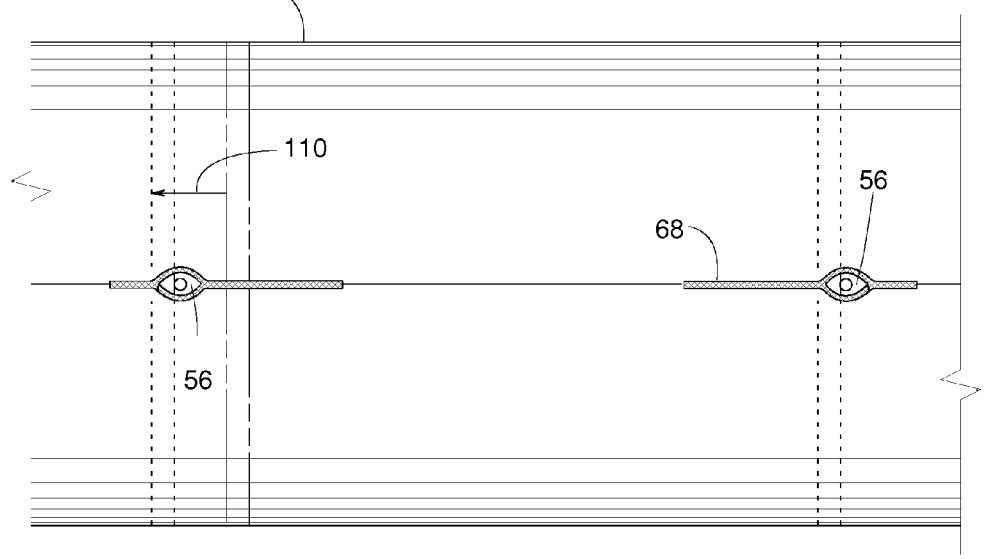
FIG. 17 is a top view similar to FIG. 16 but showing the releasable connector having closed against an example hanger.

In some examples, each opening 56 is associated with a releasable fastener attached to sidewall 24 for holding opening 56 in its less-open configuration. Examples of such a releasable fastener include, but are not limited to, a zipper 66 (FIGS. 14 and 15), a touch-and-hold fastener 68 (e.g., VELCRO, Velcro Co. of Manchester, N.H., as shown in FIGS. 16 and 17), buttons, clips, tongue-and-groove zip lock connector, laces, etc. In the example illustrated in FIGS. 14 and 15, opening 56 (e.g., opening 56a, 56b) is in the form of a slit extending from a first slit end 70 to a second slit end 72, and zipper 66 is closable from both ends 70 and 72.

Being able to close opening 56 from two ends enables opening 56 to be closed tightly against hanger 46 regardless of the opening's position relative to framework 20 and hanger 18. The left side of FIG. 15, for instance, shows opening 56a in the less-open configuration and further configured in a first biased configuration where opening 56a is more open at first slit end 70 than at second slit end 72. The right side of FIG. 15 shows opening 56b in the less-open configuration and further configured in a second biased configuration where opening 56b is more open at second slit end 72 than at first slit end 70

Figure 18:
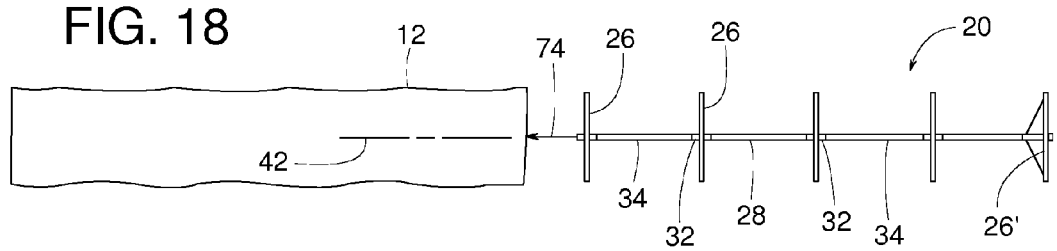
FIG. 18 is a side view showing an example framework being installed within an example pliable air duct.
Figure 19:
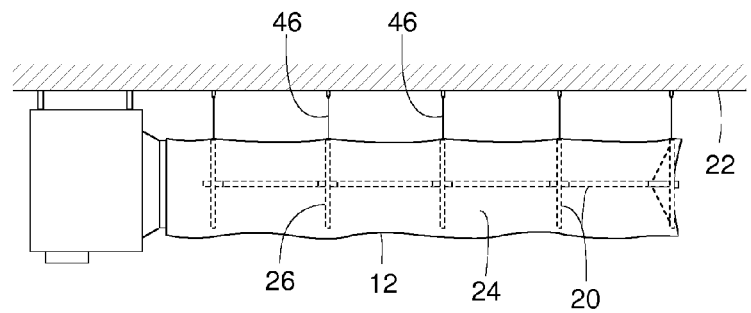
FIG. 19 is a side view showing the framework installed within the duct with the framework carrying most of the duct's weight.
Figure 20:
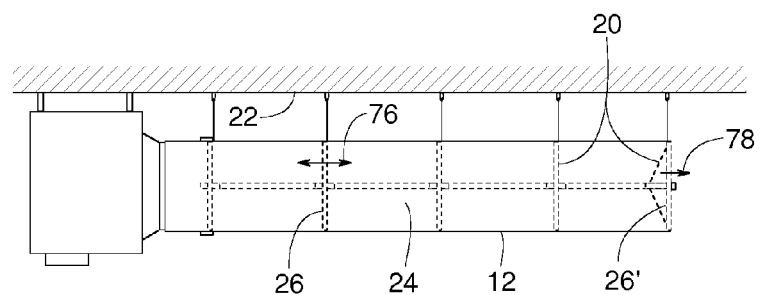
FIG. 20 is a side view showing the framework being lengthened.
Figure 21:
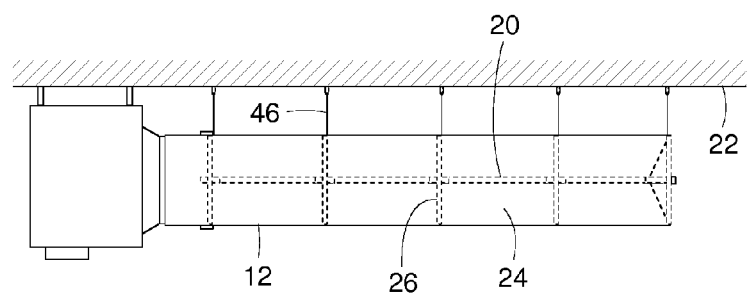
FIG. 21 is a side view showing the framework carrying most of the duct's weight after the framework was lengthened.

FIGS. 18-21 illustrate various air duct methods. FIG. 18 and arrow 74, for example, illustrate installing a framework 20 inside air duct 12. Framework 20 includes a plurality of ribs 26 that are spaced apart in longitudinal direction 42. FIG. 19 shows a plurality of hangers 46 suspending framework 20 from overhead support 22 such that framework 20 supports most of the total weight of sidewall 24. The plurality of hangers 46 are shown being distributed and spaced apart in longitudinal direction 42. After suspending framework 20 from overhead support 22, arrows 76 and 78 (FIG. 20) and arrow 110 (FIGS. 15 and 17) represent adjusting (e.g., relative material shifting), in longitudinal direction 42 relative to sidewall 24, a position of at least one rib of the plurality of ribs 26. Such adjustment or relative material shifting between sidewall 24 and one or more ribs 26 can be performed by various means examples of which include, but are not limited to, air-pressurizing an interior volume 80 of air duct 12 by energizing blower 16, longitudinal stretching of sidewall 24, and extending a length of framework 20 (e.g., see FIGS. 22 and 23). After adjusting the position of at least one rib 26 relative to sidewall 24, FIG. 21 shows the plurality of hangers 46 suspending framework 20. Also, arrows 82 and 84 of FIG. 14 represent adjusting opening 56 for accommodating previous adjustment or relative movement between rib 26 and sidewall 24.

Figure 22:
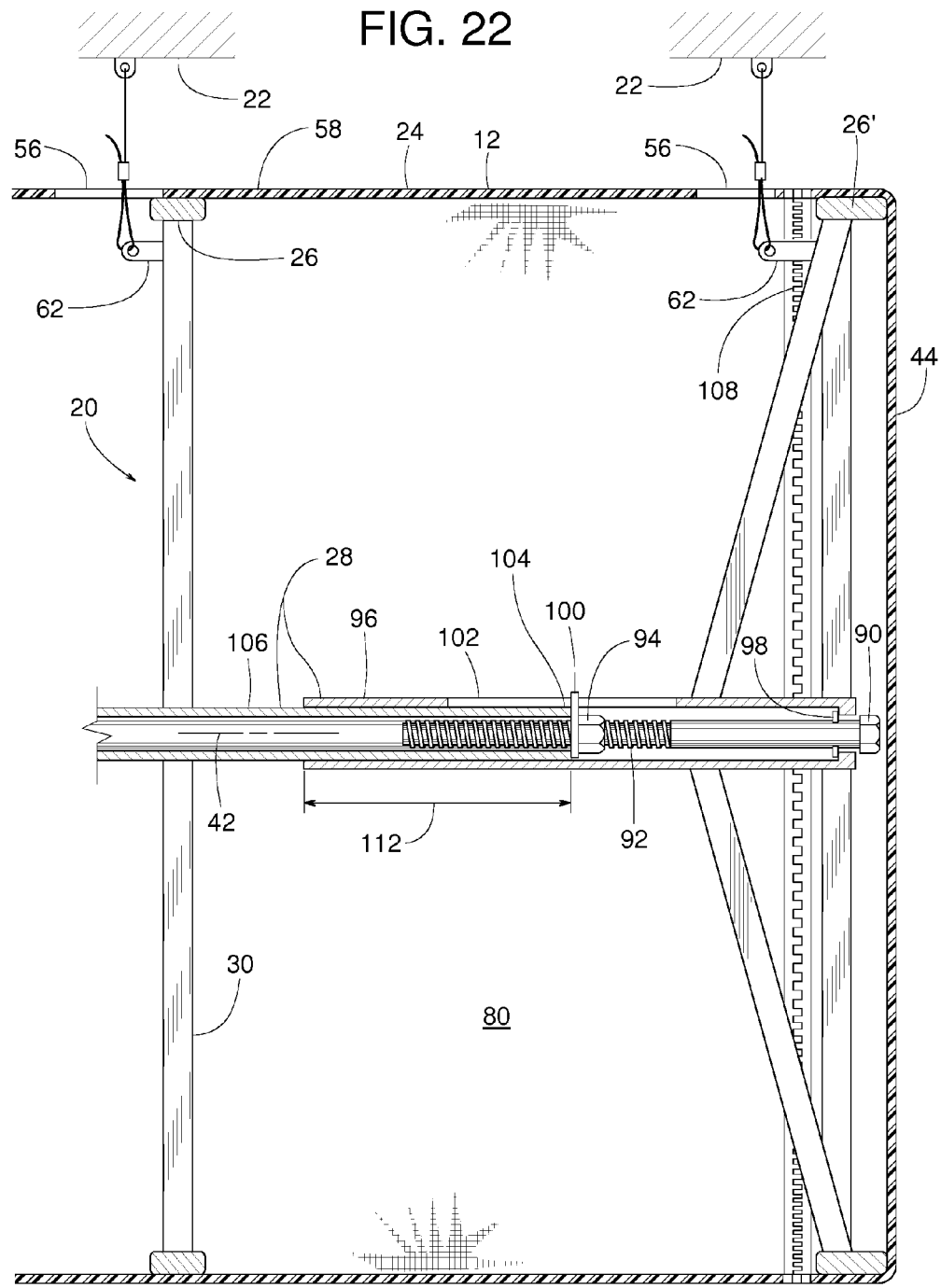
FIG. 22 is a cross-sectional side view of an end portion of an example air duct system with extendible framework.
Figure 23:
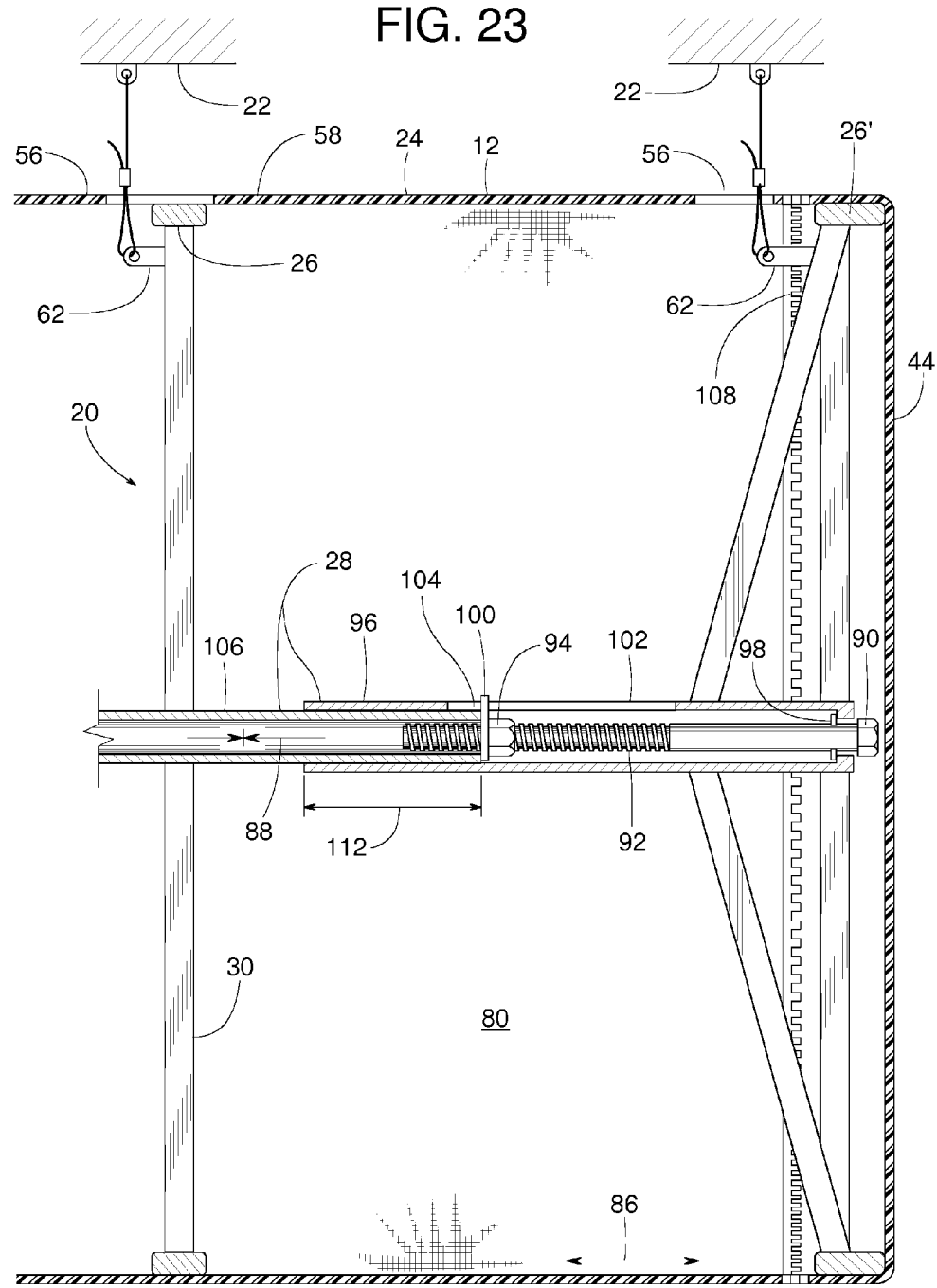
FIG. 23 is a cross-sectional side view similar to FIG. 22 but showing the framework extended.

In some examples, the length of framework 20 is adjusted mechanically by virtue of shaft 28 having a section of adjustable overlap 112 in longitudinal direction 42, as shown in FIGS. 22 and 23. Although adjusting the length of framework 20 can affect the alignment of openings 56 relative to framework 20, the primary purpose of lengthening framework 20 is for keeping duct 12 in a generally expanded shape by holding sidewall 24 in longitudinal tension 86 and holding framework 20 in longitudinal compression 88. In the illustrated example, the length of the framework's shaft 28 (e.g., shaft assembly) is adjusted by rotating a head 90 of a screw 92. Screw 92 threadingly engages a nut 94 that is radially keyed for anti-rotation relative to a tubular shaft segment 96 of shaft 28, and a shoulder 98 on screw 92 limits axial movement between screw 92 and shaft segment 96. The keyed feature, in some examples, comprises a protrusion 100 extending from nut 94 and slidingly engaging a slot 102 in shaft segment 96, thus nut 94 and protrusion 100 slide axially along slot 102 as screw head 90 is rotated. Nut 94 and/or protrusion 100 engages an axial end 104 of a tubular shaft segment 106 of shaft 20, and shaft segment 106 telescopically slides within shaft segment 96. Consequently, as turning head 90 forces the translation of nut 94 along shaft segment 96, the nut's axial position establishes the telescopic overlap between shaft segments 96 and 106, thus establishing the adjusted length of the framework's shaft 28. Since section of adjustable overlap 112 is less in FIG. 23 than in FIG. 22, shaft 28 of framework 20 is shorter in FIG. 22 than in FIG. 23 (note: FIG. 23 shows less longitudinal overlap between shaft segments 96 and 106).

Adjustably lengthening shaft 28 pushes a rib 26' against end cap 44, which places sidewall 24 in longitudinal tension 86 and framework 20 in longitudinal compression 88. Framework 20 thus holds duct 12 in a generally expanded shape, radially and axially, even during a period when internal volume 80 of duct 12 is subjected to an air pressure no greater than the atmospheric pressure surrounding the duct's exterior, e.g., during a period when blower 16 is inactive.

In some examples, rib 26' is extra wide to provide axial clearance between head 90 and end cap 44. In some examples, manual access to head 90 is made available by temporarily opening a zipper 108 that joins end cap 44 to duct 12. In some examples, a small central opening in end cap 44, adjacent to head 90, provides manual access to head 90.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. An air duct system, comprising:
an air duct having a pliable sidewall to extend in a longitudinal direction, the pliable sidewall defining a plurality of openings, the pliable sidewall having a total weight;
a framework to be disposed within the air duct, the framework comprising a material of less flexibility than that of the pliable sidewall, the framework further comprising:
a shaft extending in the longitudinal direction;
a rib to engage an inner surface of the air duct; and
a plurality of spokes connecting the rib to the shaft; and
a plurality of hangers corresponding to the plurality of openings, each hanger of the plurality of hangers comprising an elongate member having an upper section and a lower section, the lower section to be coupled to the framework via access through a corresponding opening of the plurality of openings, and most of the total weight of the pliable sidewall to be carried by the framework.

2. An air duct system, comprising:
an air duct having a pliable sidewall in a tubular shape to define a longitudinal direction, the pliable sidewall having a total weight;
a framework disposed within the air duct, the framework comprising:
a material of less flexibility than that of the pliable sidewall,
a shaft being of adjustable length by virtue of the shaft having a section of adjustable overlap in the longitudinal direction; and
a plurality of ribs coupled to the shaft, the ribs to engage an inner surface of the air duct; and
a plurality of hangers with one or more of the hangers comprising an elongate member having an upper section and a lower section, the upper section being above the air duct, the lower section being coupled to the framework, and most of the total weight of the pliable sidewall being carried by the framework.

3. An air duct system, comprising:
an air duct having a pliable sidewall in a tubular shape to define a longitudinal direction, the pliable sidewall defining a plurality of openings one or more of which have a more-open configuration and a less-open configuration;
a framework to be disposed within the air duct, the framework comprising a material of less flexibility than that of the pliable sidewall, the framework comprising:
a shaft to extend in the longitudinal direction; a plurality of ribs to engage an inner surface of the air duct, the plurality of ribs to be spaced apart in the longitudinal direction; and
a plurality of spokes connecting the plurality of ribs to the shaft; and
a plurality of hangers corresponding to the plurality of openings, one or more of the hangers comprising an elongate member having an upper section and a lower section, the lower section to be coupled to the framework via access through a corresponding opening of the plurality of openings.

4. The air duct system of claim 3, wherein the pliable sidewall has a total weight, and most of the total weight of the pliable sidewall is carried by the framework.

5. The air duct system of claim 3, wherein the air duct is to be in longitudinal tension, and the shaft is to be in longitudinal compression.

6. The air duct system of claim 3, wherein the plurality of openings are to be substantially at an uppermost surface of the pliable sidewall.

7. The air duct system of claim 3, wherein the plurality of openings are spaced apart in the longitudinal direction.

8. The air duct system of claim 7, wherein each opening of the plurality of openings is a slit extending in the longitudinal direction.

9. The air duct system of claim 8, wherein the slit extends longitudinally from a first slit end to a second slit end, the slit in the less-open configuration is further selectively configurable in a first biased configuration and a second biased configuration, the slit being open more at the first slit end than at the second slit end when the slit is in the first biased configuration, the slit being open more at the second slit end than at the first slit end when the slit is in the second biased configuration.

10. The air duct system of claim 3, further comprising a releasable fastener associated with a respective one of the openings, the releasable fastener to holding the corresponding opening in the less-open configuration when the corresponding opening is in the less-open configuration.

11. The air duct system of claim 10, wherein the releasable fastener comprises a touch-and-hold fastener attached to the pliable sidewall.

12. The air duct system of claim 10, wherein the releasable fastener comprises a zipper attached to the pliable sidewall.

13. The air duct system of claim 3, wherein the lower section comprises a releasable connector to be selectively engaged or disengaged with the framework.

14. The air duct system of claim 3, wherein each hanger of the plurality of hangers extend through its corresponding opening of the plurality of openings.

15. The air duct system of claim 3, wherein the framework includes a plurality of protrusions extending upward through the plurality of openings.

16. The air duct system of claim 3, wherein the plurality of hangers include a plurality of length adjusters that provide the plurality of hangers with an adjustable length between the upper section and the lower section.

17. The air duct system of claim 3, wherein each rib of the plurality of ribs is a ring.

18. The air duct system of claim 17, wherein the ring is comprised of bar stock having a rectangular cross-section with rounded corners.

19. An air duct method, comprising:
installing a framework inside an air duct, the air duct comprising a pliable sidewall in a tubular shape to define a longitudinal direction, the pliable sidewall having a total weight, the framework comprising a plurality of ribs that are spaced apart in the longitudinal direction;
suspending the framework from a plurality of hangers extending from an overhead support such that the framework supports most of the total weight of the pliable sidewall, the plurality of hangers being distributed and spaced apart in the longitudinal direction;
after suspending the framework from the overhead support, adjusting in the longitudinal direction relative to the pliable sidewall a position of at least one rib of the plurality of ribs; and the plurality of hangers suspending the framework after adjusting the position of the at least one rib.

20. The air duct method of claim 19, wherein the adjusting in the longitudinal direction relative to the pliable sidewall the position of the at least one rib of the plurality of ribs is performed by air-pressurizing an interior volume of the air duct.

21. The air duct method of claim 19, wherein the adjusting in the longitudinal direction relative to the pliable sidewall the position of the at least one rib of the plurality of ribs is performed by extending a length of the framework.

22. The air duct method of claim 19, wherein the pliable sidewall defines an opening providing access for coupling one hanger of the plurality of hangers to the framework, the air duct method further comprising adjusting the opening for accommodating adjusting in the longitudinal direction relative to the pliable sidewall the position of the at least one rib of the plurality of ribs.

23. The air duct method of claim 19, wherein the framework comprises:
   a shaft extending in the longitudinal direction;
   a plurality of rings serving as the plurality of ribs, the plurality of rings engaging an inner surface of the air duct; and
   a plurality of spokes connecting the plurality of rings to the shaft.

24. The air duct method of claim 19, further comprising:
   during at least one period, subjecting an internal volume of the air duct to a pressure no greater than a surrounding atmospheric pressure;
   during the at least one period, holding the pliable sidewall in longitudinal tension; and
   during the at least one period, holding the framework in longitudinal compression.

* * * * *